April 22, 1930.  L. F. WILSON  1,755,941
BEEHIVE FRAME HOOK
Filed May 11, 1928
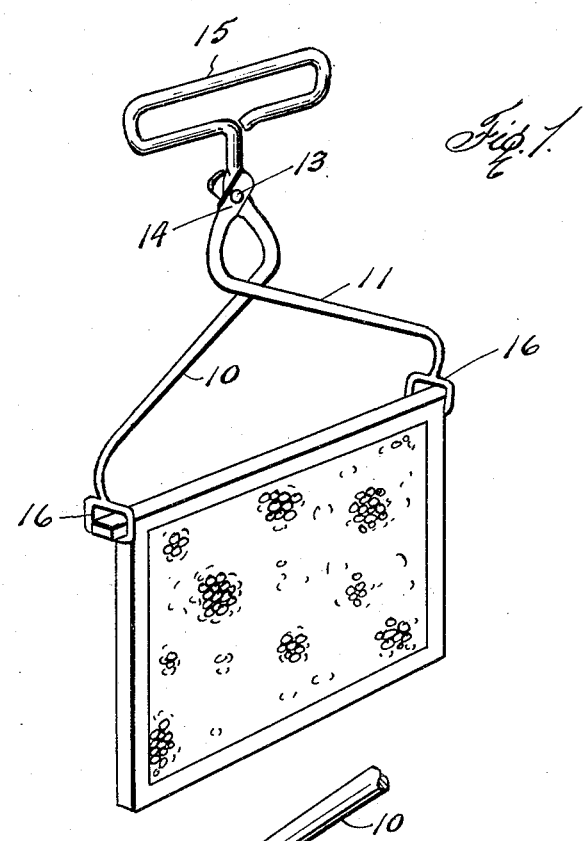
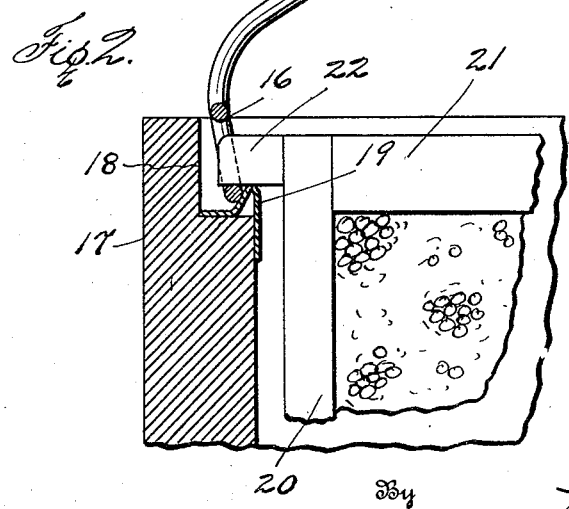
Inventor
L. F. Wilson
John M. Spellman
Attorney Patented Apr. 22, 1930

1,755,941

UNITED STATES PATENT OFFICE

LAURENCE F. WILSON, OF DALLAS, TEXAS

BEEHIVE-FRAME HOOK

Application filed May 11, 1928. Serial No. 277,076.

This invention appertains to novel and useful improvements in bee hive tools, designed principally for modern bee hives, the frames of which have an extending portion at each end of the top bar.

The primary object of the invention is to provide a pair of bee hive frame hooks that may readily and quickly grasp a frame in an ordinary modern bee hive, thus facilitating easy removal of same.

Another object of the invention is to provide a set of bee hive frame hooks of the character aforementioned that will be very simple, inexpensive, durable and efficient for the purposes intended.

A construction designed to carry out the invention will be hereinafter described together with other features of the invention.

The invention will be more readily understood from a reading of the following specification and by reference to the accompanying drawings, in which an example of the invention is shown, and wherein:

Figure 1 is a perspective view, the hooks shown holding a modern bee hive frame, constructed in accordance with my invention, and Figure 2 is an enlarged sectional detail of the bee hive and component parts showing one end of my hooks engaged with the frame.

Employing like characters of reference for corresponding parts throughout, the numerals 10 and 11 respectively designate a pair of corresponding arms or members which are pivotally connected together near their upper ends by a rivet 13 or other suitable means. The upper portions of the arms are flattened at 14 to receive the rivet or other pivotal means and a suitably shaped handle 15 is connected to the arms by the pivotal means between said arms.

The lower ends of the arms terminate in suitably shaped loops 16 which are provided for engagement with the bee hive frame, as is obvious by referring to the accompanying drawing the arms 10 and 11 are slightly tapered, smaller at the lower portion than at their upper. This is done in order that the arms may be stronger, yet facilitate easier engagement with the bee hive frames, between the narrow space of the upright sides of the hive and the top bar of the frames.

In Figure 2 I have shown a sectional view of a modern bee hive showing a portion of one of the arms of my hooks in engagement. The numeral 17 designates an upright side of a modern bee hive having a cut out portion 18 extending the entire length of the side. A metal rabbet 19 is suitably fastened to the bottom of the cut out portion. A bee hive frame 20 has a top bar 21 provided with outwardly extending lugs 22 which rest upon the metal rabbet on the upright portion of the bee hive.

In practice, the brood chamber where usually are to be found the deeper frames, the top bar lugs 22 rest on the tin rabbet 19 which is approximately 3/8" high and projects over it about the same distance. There is also a similar space between said top bar and the inside of the hive. This provides a projection at the ends of the frames that the loops 16 of the arms 10 and 11 may easily and readily be engaged over.

With this new and modern pair of hooks, after the frames have been cracked apart by the hive tool, the hooks are lopped over the free ends of the frames. As is seen, the harder the frame is stuck, or the heavier it is, the tighter the hooks grip.

Various changes in the size and shape of the different parts, as well as modifications and alterations may be made within the scope of the appended claim.

Having now described this invention and explained the mode of its operation, what I claim for my invention is:

In a device adapted to be used in connection with bee hives for handling bee hive frames formed with oppositely projecting lugs fitting within said bee hives, the combination with a pair of arms, of a handle therefor, each of said arms being of substantially Z shape and comprising a body portion and upper and lower end portions, the upper end portions of said arms being pivoted together and to said handle by the same pivot, the lower end portions of said arms being formed with rectangular loops for receiving said oppositely projecting lugs of the bee hive frame, the cross section of said arms gradually decreasing from said upper end portion throughout said body portion to said lower end portion, permitting said lower end portions and said rectangular loops to be relatively slender for insertion into said bee hive and attachment to said lugs for ready withdrawal of said frame from said bee hive, said arms when in operative position on said hive frame having their body portions extending respectively in opposite directions and said body portions crossing each other intermediate said pivot and said loops.

In testimony whereof I affix my signature.

LAURENCE F. WILSON.